United States Patent Office 2,970,728
Patented Feb. 7, 1961

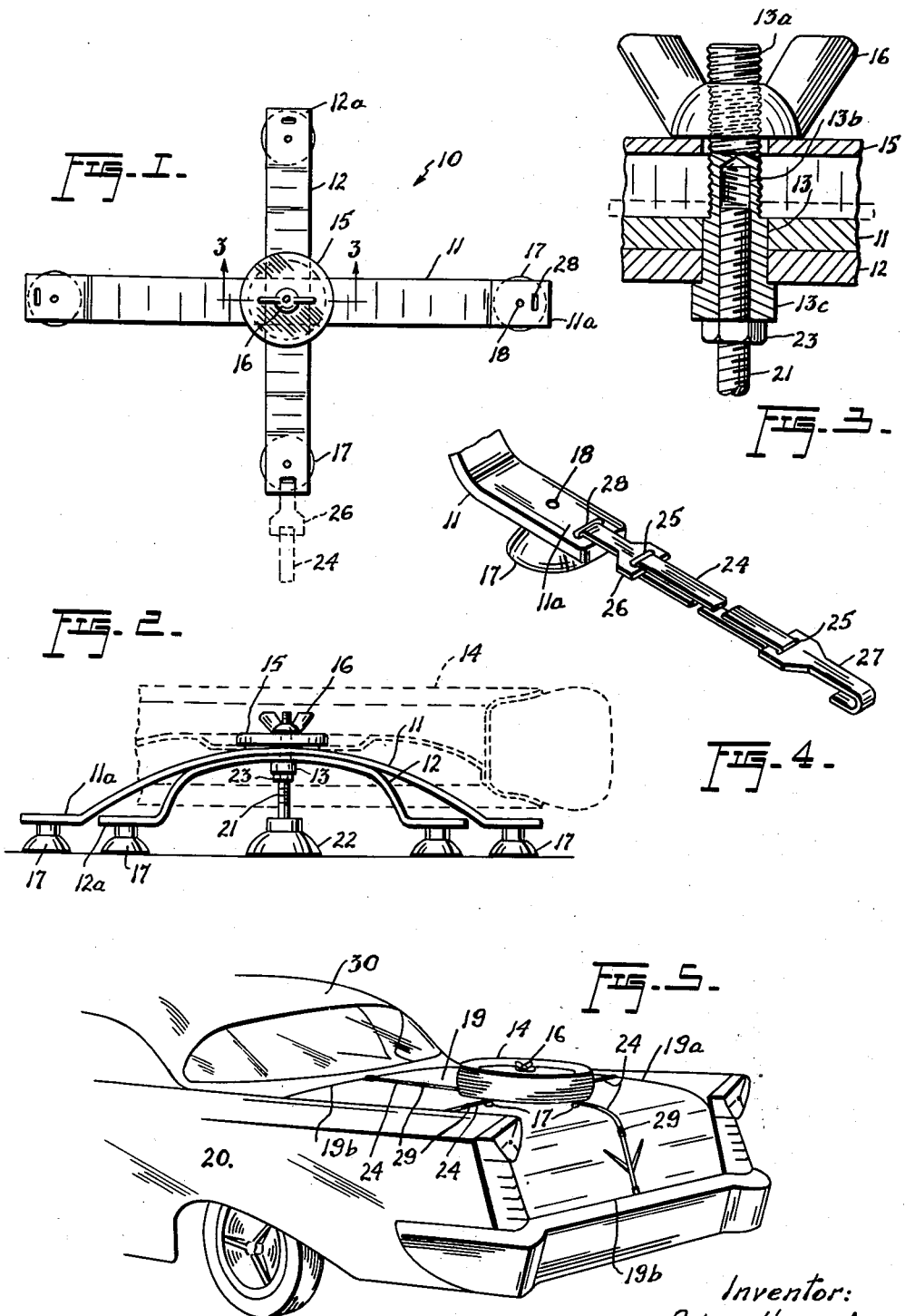

2,970,728

AUXILIARY SPARE TIRE CARRIERS

Adam Haas, Jr., Kansas City, Kans.

Filed July 11, 1957, Ser. No. 671,362

1 Claim. (Cl. 224—42.12)

This invention relates to new and useful improvements in spare tire carriers for automobiles and other similar vehicles, and the principal object of the invention is to provide an auxiliary spare tire carrier which, under certain circumstances, may be advantageously used in substitution for and/or in addition to the usual carrier with which the vehicle is ordinarily equipped.

In accordance with present day practice, the spare tire is usually supported by a carrier which is disposed inside the trunk compartment of the automobile. The tire is of considerable size and occupies a large volume of space in the trunk compartment, particularly in instances where the trunk compartment is relatively small. Thus, when the trunk compartment is loaded, such as for example, while travelling on long trips, the presence of the spare tire therein results in a substantial loss of space which could otherwise be usefully employed to accommodate luggage, or the like.

The present invention eliminates this disadvantage by permitting the spare tire to be removed from the trunk compartment and carried exteriorly of the vehicle, such as for example, on the outside of the trunk lid or deck, so that the space otherwise occupied by the tire in the trunk compartment becomes available for luggage or other material placed in the trunk.

An important feature of the invention, therefore, resides in the provision of an auxiliary spare tire carrier which is adapted for attachment exteriorly to the vehicle body, such as to the trunk deck or to the roof deck, while another important feature resides in the provision of means for removably retaining the auxiliary carrier in position, these means being so arranged that they do not scratch, mar, or otherwise damage the automobile.

Another important feature of the invention resides in arranging the auxiliary carrier so that it may be quickly and easily folded into a compact form and conveniently stored away when it is not in use.

Some of the advantages of the invention reside in its simplicity of construction and operation, in its durability, in its adaptability for use with automobiles of various types and sizes, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

Figure 1 is a top plan view of the auxiliary spare tire carrier in accordance with the invention, showing only one of its keeper straps by dotted lines;

Figure 2 is a side elevational view of the carrier in its folded position;

Figure 3 is a fragmentary sectional view on an enlarged scale, taken substantially in the plane of the line 3—3 in Figure 1;

Figure 4 is a fragmentary perspective view of one of the carrier arms with its associated suction cup and keeper strap; and Figure 5 is a fragmentary perspective view showing the rear portion of an automobile with a spare tire mounted by the auxiliary carrier on the trunk deck.

Referring now to the accompanying drawings in detail, the auxiliary spare tire carrier is designated generally by the reference numeral 10 and embodies in its construction a pair of crossed arms 11, 12 which are pivotally connected together at their point of crossing by a fulcrum member 13.

The member 13 is in the form of a hollow stud including an externally screw-threaded upper portion 13a, a screw-threaded bore 13b and an enlarged base 13c, the arms 11, 12 being swingably mounted on the stud 13 immediately above the base 13c, as is clearly shown in Figure 3.

The spare tire wheel 14 is adapted to be positioned over the arm 11 on the stud portion 13a, whereupon a suitable inverted cup washer 15 and a wing nut 16 are positioned on the stud portion 13a to clamp the spare tire wheel in position on the carrier. It will be noted that the enlarged base 13c of the stud 13 abuts the underside of the crossed arms and that when the wheel 14 is positioned above the crossed arms with the washer 15 and nut 16 assembled on the stud portion 13a, the nut 16 prevents the stud from sliding downwardly through the arms.

As is best shown in Figure 2, the intermediate portions of the arms 11, 12 are crowned and terminate in outturned, co-planar extremities 11a, 12a, respectively, and suitable suction cups 17 are secured by fastening elements 18 to the underside of these extremities, so that the suction cups may supportably engage the outer surface of a trunk deck or lid 19 of an automobile 20, on which the auxiliary carrier is to be exteriorly positioned.

Moreover, a screw-threaded stud element 21 is adjustably positioned in the threaded bore 13b of the stud 13 and extends downwardly therefrom to carry a suction cup 22. The latter is preferably, although not necessarily larger than the cups 17 and is disposed centrally of the carrier for additional support of the same. While in some instances the deck 19 is substantially flat, in other instances it may be curved or convex. However, the adjustment of the stud element 21 in the bore 13b permits the suction cup 22 to be raised or lowered with respect to the plane of the cups 17, whereby all the cups 17, 22, may properly engage the surface of the deck 19, regardless of whether the deck is flat or not.

A lock nut 23, provided on the stud element 21 and engageable with the base 13c of the stud 13, serves to lock the stud element 21 in a preadjusted position in the bore 13b.

Means additional to the suction cups 17, 22 are provided for removably retaining the carrier on the deck 19, these means consisting of a set of flexible keeper straps 24 which are threaded through slots 25 formed in pairs of hooks 26, 27. The hooks 26 are removably receivable in slots 28 formed in the extremities 11a, 12a of the arms 11, 12, while the hooks 27 are adapted for anchorage to the marginal edges 19a, 19b of the deck 19. The straps 24 are provided with suitable conventional buckles 29 whereby the effective length thereof may be adjusted as desired, so that the straps are under a reasonable amount of tension and properly support the carrier on the trunk deck regardless of the size or shape of the latter.

It is to be noted that while the extremities 11a, 12a of the arms 11, 12 are co-planar, the arm 12 is shorter than the overlying arm 11 and consequently, upon loosening of the wing nut 16, the arms may be swung about the stud 13 to a folded position in which they are substantially parallel. Thus, the carrier may be conveniently stored away in a compact form, when it is not in use. In such a position, the straps 24 may be detached from the carrier by simply disengaging the hooks 26 from the slots 28, and the carrier may be locked in its folded position by tightening the nut 16. Of course, when the device is in use, the arms 11, 12 are swung to the operative position shown in Figure 1, wherein the arms 11, 12 are substantially at right angles to each other.

Although the auxiliary carrier is preferably attached to the outside of the trunk deck 19, it may be placed on top of the roof deck 30, if so preferred. Also, while the device is primarily intended for use in substitution for the usual carrier inside the trunk compartment to afford additional space for luggage, it may also be used in addition to the usual carrier in the trunk compartment, if for some reason it should be desired to carry two spare tires with the automobile.

Thus, while in the foregoing there has been shown and described the preferred embodiment of the invention, various modifications may be come apparent to those skilled in the art to which the invention relates. Accordingly, it is not desired to limit the invention to this disclosure, and various modifications may be resorted to, such as may lie within the spirit and scope of the appended claim.

What is claimed as new is:

In an auxiliary spare tire carrier for positioning exteriorly on an automobile body deck and the like, the combination of a pair of crossed arms having arched intermediate portions and flat co-planar end portions, a fulcrum member connecting the intermediate portions of said arms together at their point of crossing, said fulcrum member comprising a vertical stud pivotally connecting said arms and having an enlarged base in abutment with the underside of the crossed arms and also having an externally screw-threaded upper end portion projecting above the arms to receive a spare tire wheel, a wheel retaining nut provided on said upper end portion of the stud and preventing the stud from sliding downwardly through the arms when the stated wheel is in position, said stud being provided with a screw-threaded axial bore having an open lower end, a screw-threaded stud element adjustably positioned in said bore and projecting downwardly therefrom, a lock nut provided on said stud element in abutment with the lower end of said stud for locking the stud element in a selected position relative to the stud whereby the extent of downward projection of the stud element relative to the stud and the relation of the lower end of the stud element to the plane of the co-planar flat end portions of said arms may be varied, and a set of deck engaging suction cups provided at the underside of said end portions of said arms and at the lower end of said stud element, the suction cup on said stud element being vertically adjustable relative to the cups on said arms upon selected adjustment of the stud element in said stud, whereby all the suction cups in the set may fit and adhere to a deck of a predetermined contour.

References Cited in the file of this patent
UNITED STATES PATENTS

| | | |
|---|---|---|
| 948,476 | Daumeyer | Feb. 8, 1910 |
| 1,150,954 | Murphy | Aug. 24, 1915 |
| 2,556,570 | Binsfield | June 12, 1951 |
| 2,594,319 | Law | Apr. 29, 1952 |
| 2,797,744 | Smith | July 2, 1957 |
| 2,839,232 | Homeier | June 17, 1958 |